US007880903B2

(12) United States Patent
Chen

(10) Patent No.: US 7,880,903 B2
(45) **Date of Patent: *Feb. 1, 2011**

(54) IMAGE FORMING DEVICE HAVING DIVISION AND COLOR MANAGEMENT FUNCTIONS

(75) Inventor: Dayong Chen, Sagamihara (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1029 days.

This patent is subject to a terminal disclaimer.

(21) Appl. No.: 11/427,237

(22) Filed: Jun. 28, 2006

(65) Prior Publication Data

US 2007/0002353 A1 Jan. 4, 2007

(30) Foreign Application Priority Data

Jun. 30, 2005 (JP) ............................ 2005-191965

(51) Int. Cl.
*G06F 3/12* (2006.01)
*G03G 21/02* (2006.01)
*G03G 15/00* (2006.01)

(52) U.S. Cl. ........................ 358/1.1; 358/1.15; 399/79; 399/80

(58) Field of Classification Search ................ 358/1.15, 358/1.1; 399/79, 80
See application file for complete search history.

(56) References Cited

U.S. PATENT DOCUMENTS 4,240,345 A * 12/1980 Kyogoku .................... 101/103
5,300,761 A * 4/1994 Kasahara et al. ............ 235/375
6,597,469 B1 * 7/2003 Kuroyanagi ............... 358/1.15
7,558,500 B2 * 7/2009 Shibata ......................... 399/79
2003/0215269 A1 * 11/2003 Kayahara et al. ............ 399/297
2008/0007615 A1 * 1/2008 Sei .......................... 348/14.04

FOREIGN PATENT DOCUMENTS

JP 7319646 12/1995
JP 10-39703 2/1998
JP 2002-178567 6/2002
JP 2003-280879 10/2003
JP 2004-318225 11/2004
JP 2005-100111 4/2005
JP 2007-008017 1/2007

OTHER PUBLICATIONS

Office Action (with English translation) dated Jan. 9, 2009, Chinese Patent Application No. 200610092635.4.
Japanese Office Action dated Feb. 23, 2010, Japanese Patent Application No. 2005-191965 (with English translation).

* cited by examiner

*Primary Examiner*—Twyler L Haskins
*Assistant Examiner*—Fred Guillermety
(74) *Attorney, Agent, or Firm*—Patterson & Sheridan, LLP

(57) ABSTRACT

An image forming device including a printer having a plurality of operation modes sets beforehand the number of pages printed by the printer to be counted in a division counter or a division undefined counter for each operation mode of the printer. The image forming device counts, in the division counter corresponding to the division to which the user belongs who has requested the printing, the number of the pages printed in the operation mode in which the number of the pages is set to be counted in the division counter, and counts, in the division undefined counter, the number of the pages printed in the operation mode in which the number of the pages is set to be counted in the division undefined counter.

18 Claims, 7 Drawing Sheets

32

| Function | Photocopy | | | Print | | FAX reception | List printing |
|---|---|---|---|---|---|---|---|
| Mode | Monochromatic print | 2-color print | Color print | Monochromatic print | Color print | Monochromatic print | Monochromatic print |
| Division management function : valid | Division counter | Division counter | Division counter | Division counter | Division counter | Division undefined counter | Division undefined counter |
| Division management function : valid<br>Color management function : valid | Division undefined counter | Division or division undefined | Division counter | Division undefined counter | Division counter | Division undefined counter | Division undefined counter |

32

| Function | Photocopy | | | Print | | FAX reception | List printing |
|---|---|---|---|---|---|---|---|
| Mode | Monochromatic print | 2-color print | Color print | Monochromatic print | Color print | Monochromatic print | Monochromatic print |
| Division management function : valid | Division counter | Division counter | Division counter | Division counter | Division counter | Division undefined counter | Division undefined counter |
| Division management function : valid<br>Color management function : valid | Division undefined counter | Division or division undefined | Division counter | Division undefined counter | Division counter | Division undefined counter | Division undefined counter |

FIG. 3

IMAGE FORMING DEVICE HAVING DIVISION AND COLOR MANAGEMENT FUNCTIONS

CROSS-REFERENCE TO RELATED APPLICATIONS

This application is based upon and claims the benefit of priority from prior Japanese Patent Application No. 2005-191965, filed Jun. 30, 2005, the entire contents of which are incorporated herein by reference.

BACKGROUND OF THE INVENTION

1. Field of the Invention

The present invention relates to an image forming device such as a digital multifunction machine having a division management function which manages use results such as the number of pages printed for each division, and a method of managing the image forming device.

2. Description of the Related Art

Heretofore, among image forming devices such as a digital multifunction machine, there is a device having a function which manages the number of printed pages. In an image forming device such as the digital multifunction machine or a printer having a network communication function, there is assumed an operation mode in which the device is utilized by a large number of users. Among such image forming devices, there is a device having a function referred to as a division management function which manages the number of pages printed by each management unit referred to as a division. In this division management function, a division counter set in each division counts the number of the pages printed by each division.

BRIEF SUMMARY OF THE INVENTION

In one aspect of this invention, an object is to provide an image forming device capable of appropriately managing use results in accordance with user's request, and a method of managing the image forming device.

An image forming device as one aspect of this invention has: a printer having a plurality of operation modes to form an image on an image forming medium; a plurality of first counters which are associated with divisions to which users belong, respectively; a second counter which is not associated with any specific division; a setting unit to set the number of pages printed by the printer to be counted in the first counter or the second counter for each operation mode of the printer; a first counting unit to count, in the first counter corresponding to the division to which the user belongs who has requested the printing, the number of the pages printed in the operation mode in which the setting unit sets the number of the pages to be counted in the first counter; and a second counting unit to count, in the second counter, the number of the pages printed in the operation mode in which the setting unit sets the number of the pages to be counted in the second counter.

A method of managing an image forming device as another aspect of this invention: sets beforehand the number of printed pages to be counted in a plurality of first counters associated with divisions to which users belong, respectively or a second counter which is not associated with any specific division for each operation mode of printing; executes the printing in various operation modes; counts, in the first counter corresponding to the division to which the user belongs who has requested the printing, the number of the pages printed in the operation mode in which the number of the pages is set to be counted in the first counter; and counts, in the second counter, the number of the pages printed in the operation mode in which the number of the pages is set to be counted in the second counter.

An image forming device as still another aspect of this invention has: image forming means having a plurality of operation modes to form an image on an image forming medium; a plurality of first counters associated with divisions to which users belong, respectively; a second counter which is not associated with any specific division; setting means for setting the number of pages having the image formed thereon by the image forming means to be counted in the first counter or the second counter for each operation mode of the image forming means; first counting means for counting, in the first counter corresponding to the division to which the user belongs who has requested the image forming, the number of the pages having the image formed thereon in the operation mode in which the setting means sets the number of the pages to be counted in the first counter; and second counting means for counting, in the second counter, the number of the pages having the image formed thereon in the operation mode in which the setting means sets the number of the pages to be counted in the second counter.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a diagram showing an example of count-up setting information;

DETAILED DESCRIPTION OF THE INVENTION

Figure 1:
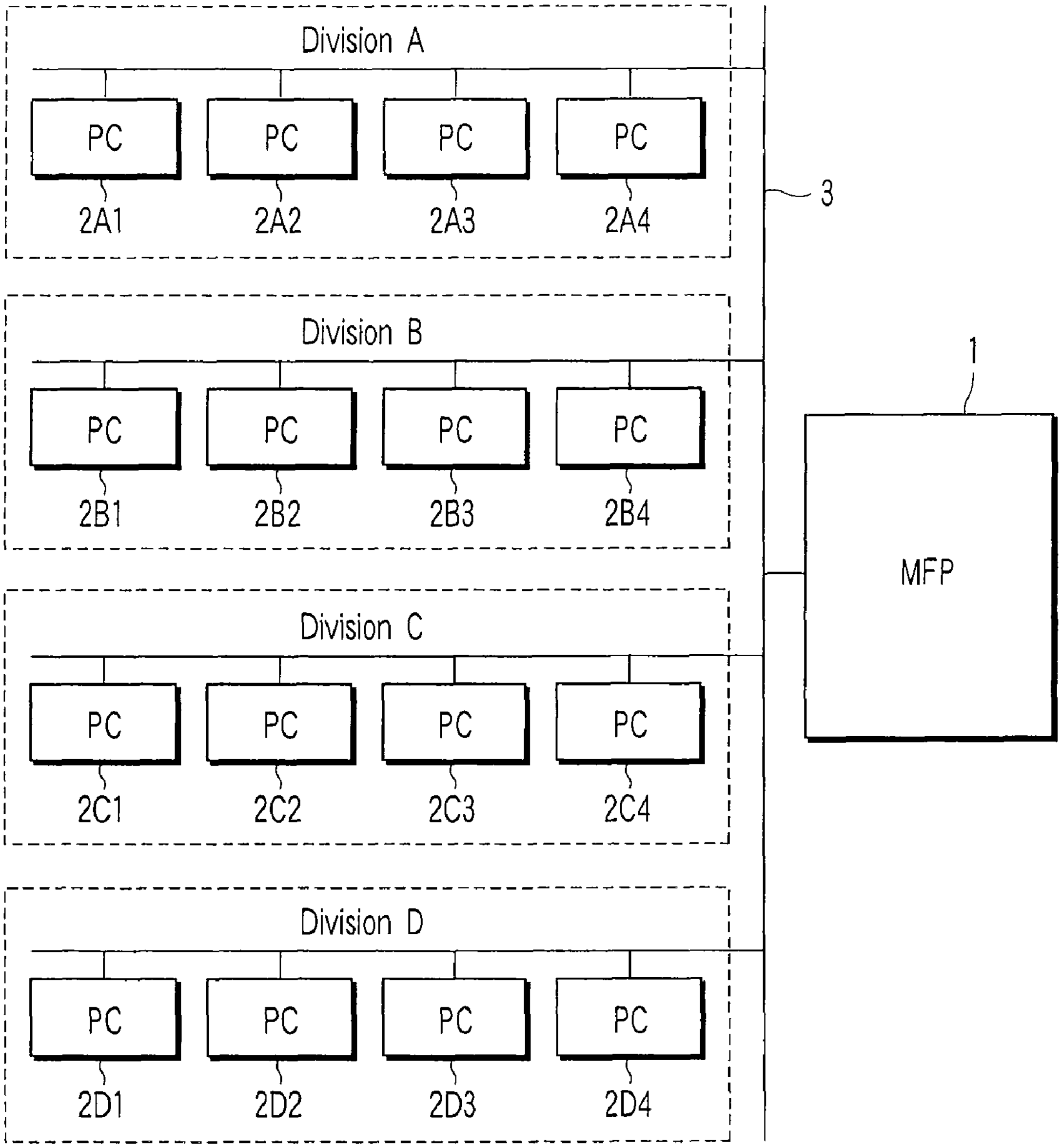
FIG. 1 is a diagram schematically showing a constitution example of an image forming system in an embodiment of the present invention.

An embodiment for carrying out this invention will be described hereinafter with reference to the drawing.

FIG. 1 is a diagram showing a schematic constitution of an image forming system in the embodiment of this invention.

As shown in FIG. 1, in this image forming system, a digital multifunction machine (multifunction peripheral [MFP]) 1 as an image forming device is connected to a plurality of personal computers (PCs) 2 (2A1 to 2A4, 2B1 to 2B4, 2C1 to 2C4 and 2D1 to 2D4) by a network 3 such as a local area network (LAN).

The MFP 1 mainly has a printer function, a scanner function, a photocopying function, a facsimile transmitting and receiving function and the like. The MFP 1 has a function which processes a color image and a function which processes a monochromatic image.

That is, the MFP 1 has: a color scanning function which chromatically reads an image of a draft; a monochromatic scanning function which monochromatically reads the image of the draft; a color printing function which forms a color image on an image forming medium; and a monochromatic printing function which forms a monochromatic image on the image forming medium.

Accordingly, the MFP 1 realizes color photocopy and monochromatic photocopy as the photocopying function, and realizes color print and monochromatic print as the printer (network printing) function. It is to be noted that as the facsimile receiving function, the monochromatic print is performed.

Each PC 2 is constituted of a main body having a network interface (not shown), a display unit (not shown), an operation unit (not shown) and the like. The PC 2 has a function which requests the MFP 1 to print the image via the network 3. In the function which requests the MFP 1 to print the image, each PC 2 transmits color image data or monochromatic image data as printing image data.

For example, when the PC 2 requests the MFP 1 to print the color image data, the peripheral performs the color print based on the color image data received by a network printing function. When the PC 2 requests the MFP 1 to print the monochromatic image data, the peripheral performs the monochromatic print based on the monochromatic image data received by the network printing function.

Moreover, it is assumed that the PCs 2 (2A1 to 2A4, 2B1 to 2B4, 2C1 to 2C4 and 2D1 to 2D4) are assigned to the users divided into groups referred to as divisions, respectively. Here, the division refers to the group to which each user having each PC 2 assigned thereto belongs. In an organization such as a company, it is assumed that a department, a section or the like as a place to which each of a plurality of users belongs corresponds to the division.

In a constitution example shown in FIG. 1, it is indicated that a plurality of PCs 2A1 to 2A4 are used by the users who belong to a division A. In FIG. 1, it is also indicated that a plurality of PCs 2B1 to 2B4 are used by the users who belong to a division B. It is further indicated in FIG. 1 that a plurality of PCs 2C1 to 2C4 are used by the users who belong to a division C. It is further indicated in FIG. 1 that a plurality of PCs 2D1 to 2D4 are used by the users who belong to a division D.

Next, there will be described a constitution of a control system of the MFP 1.

Figure 2:
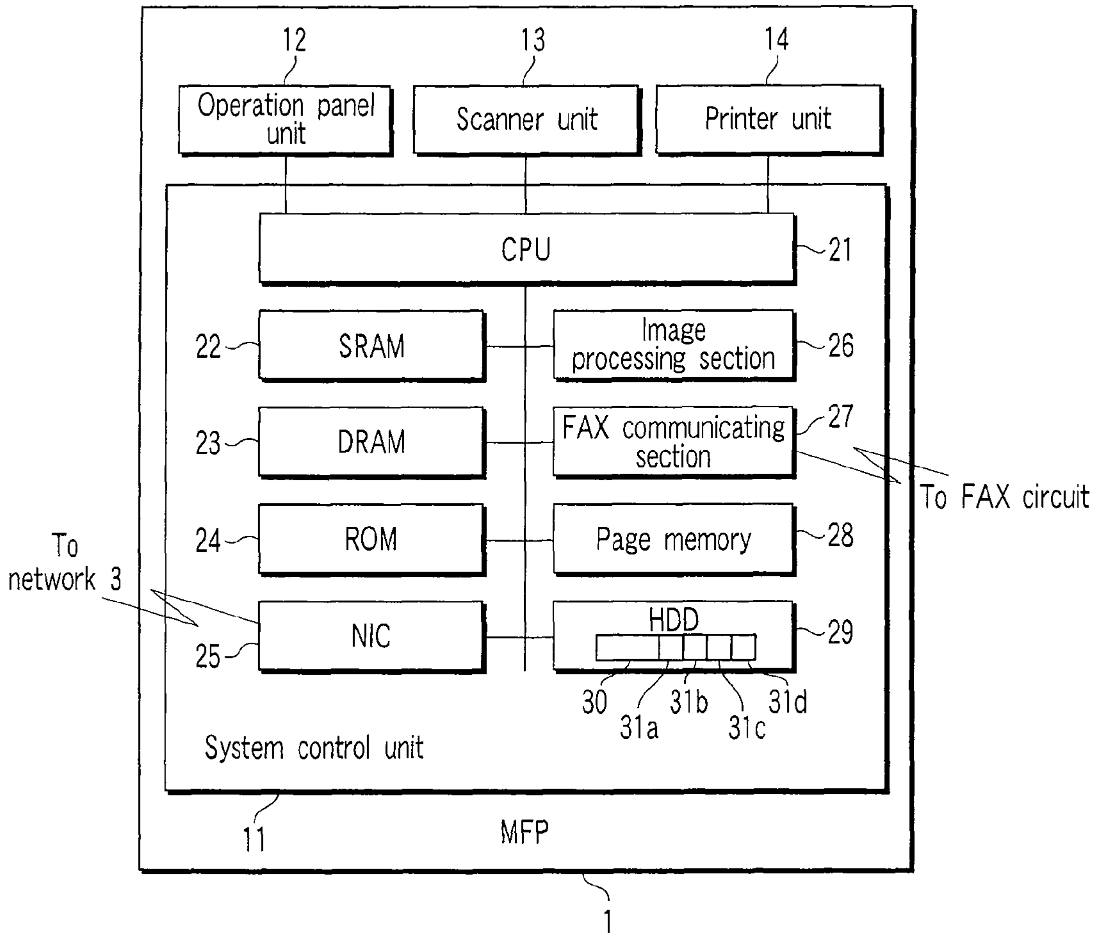
FIG. 2 is a block diagram schematically showing a constitution example of a digital multifunction machine.

FIG. 2 is a block diagram showing a constitution example of the control system of the MFP 1.

As shown in FIG. 2, this MFP 1 is constituted of a system control unit 11, an operation panel 12, a scanner unit 13, a printer unit 14 and the like.

The system control unit 11 controls the whole MFP 1. The system control unit 11 is connected to the operation panel 12, the scanner unit 13, the printer unit 14 and the like. Accordingly, the system control unit 11 accepts an operation instruction input into the operation panel 12, controls the scanner unit 13, or controls the printer unit 14. In addition to the function which controls the scanner unit 13 and the printer unit 14, the system control unit 11 also has functions which perform various types of processing such as network communication control, facsimile transmission and reception, division (or user) authentication, data management, image judgment and image correction.

The operation panel 12 is a user interface. The operation panel 12 is constituted of hardware keys (not shown), a display device (not shown) containing a touch panel and the like. The operation panel 12 displays an operation guidance and the like, and an operation instruction is input. Settings of various types of functions, setting information and the like are input by the operation panel 12.

The scanner unit 13 converts the draft image into image data. The scanner unit 13 converts the draft image into chromatic or monochromatic digital image data. The scanner unit 13 is constituted of: a scanning section (not shown) which optically scans a draft face; a photoelectric converting section (not shown) such as a CCD line sensor which converts, into an electric signal, reflected light from the draft face optically scanned by the scanning section and the like. The scanner unit 13 supplies the digital image data as the read draft image to the system control unit 11.

The printer unit 14 forms the image on the image forming medium. The printer unit 14 has: a color printing function which forms a color image on the image forming medium based on the color image data; and a monochromatic printing function which forms a monochromatic image on the image forming medium based on the monochromatic image data. The printer unit 14 is constituted of: a conveying section (not shown) which conveys the image forming medium; an image forming section (not shown) which forms a color image or a monochromatic image on the image forming medium conveyed by the conveying section and the like. The printer unit 14 prints the image data of each page on the image forming medium based on the control performed by the system control unit 11.

Moreover, as shown in FIG. 1, the system control unit 11 is constituted of: a central processing unit (CPU) 21; a static random access memory (SRAM) 22; a dynamic random access memory (DRAM) 23; a read only memory (ROM) 24; a network communication section 25; an image processing section 26; a facsimile (FAX) communicating section 27; a page memory 28; a hard disk drive (HDD) 29 and the like.

The CPU 21 controls the whole system control unit 11. The CPU 21 operates based on a control program to perform various types of processing. The CPU 21 is connected to the operation panel 12, the scanner unit 13, the printer unit 14 and the like.

The SRAM 22 is backed up by a battery (not shown), and used as a memory which stores system setting information and the like. Data for changing and the like are stored in the SRAM 22. For example, a counter value of the number of the pages printed by a division management function described later is counted up in a counter set in the SRAM 22.

The DRAM 23 is a memory which temporarily stores data for operation or stores data to be referred to. The DRAM 23 is used as a main memory. In a case where, for example, the system setting information and the like are referred to from the outside, the information stored in the DRAM 23 is referred to.

The ROM 24 is a nonvolatile memory. In the ROM 24, there are stored, for example, the control program, control data and the like for controlling the MFP 1. The network communication section 25 controls data communication via the network 3. The network communication section 25 is constituted of a network interface card (NIC) to be connected to the network 3 and the like. In the network communication section 25, a network printer function receives a request for printing the printing image data and the like from each PC 2 via the network 3.

The image processing section 26 subjects the image data to various types of image processing. The image processing section 26 is constituted of an image processing circuit and the like. The image processing section 26 performs image processing such as correction, compression or extension of the image data. The facsimile communicating section 27 is an interface which transmits and receives facsimile data. For example, facsimile reception processing is realized by monochromatically printing, by the printer unit 14, facsimile data received by the facsimile communicating section 27, and facsimile transmission processing is realized by converting the draft image data read by the scanner unit 13 into facsimile data, and transferring the data to a destination by the facsimile communicating section 27.

The page memory 28 is a memory having at least a storage region to develop the image data for one page to be printed by the printer unit 14. The page memory 28 is controlled by a page memory controller (not shown). For example, in a case where the printer unit 14 performs the print processing, in the page memory 28, there is developed (stored) the color image data or the monochromatic image data of each page to be printed by the printer unit 14.

The HDD 29 is a large-capacity storage device. The HDD 29 is also used as a memory for backup of various types of data, and various types of setting data or management data are stored. In the HDD 29, there is stored data received via the network 3, the image data read by the scanner unit 13 or the like, if necessary. In the present embodiment, in the HDD 29, there is stored division management information such as a division code corresponding to a division constituting a management object of the division management function described later.

Moreover, the HDD 29 is provided with: a division undefined counter 30 in which the corresponding division is not defined; a division counter 31 (31*a*, 31*b*, 31*c* and 31*d*) for each division constituting the management object of the division management function as the division management means and the like. The division undefined counter 30 is a counter which is not associated with any specific division (a counter in which the division is not defined). The division counters 31*a*, 31*b*, 31*c* and 31*d* are counters associated with the divisions as the management objects, respectively, by the division management function.

It is to be noted that in the constitution example shown in FIG. 2, there is assumed a case where, as shown in FIG. 1, the divisions A, B, C and D are set as the divisions constituting the management objects of the MFP 1. Therefore, in the MFP 1, the divisions A, B, C and D are set as the management objects of the division management function described later. In this case, in the HDD 29, there are stored division management information such as the division codes corresponding to the divisions A, B, C and D, and there are arranged the division counters 31*a*, 31*b*, 31*c* and 31*d* associated with the divisions A, B, C and D as the divisions constituting the management objects. That is, the division counter 31 is set for each division constituting the management object of the division management function of the MFP 1.

Further in the HDD 29, count-up setting information 32 is stored which defines a method of counting the number of pages printed by the printer unit 14. In the count-up setting information 32, there are set count-up specifications of the counters in accordance with various types of functions and operation modes. The count-up setting information 32 includes information which can be set by the user or a manager.

Next, there will be described the color print and the monochromatic print in the MFP 1 constituted as described above.

Here, it is assumed that the MFP 1 manages various types of processing such as a series of photocopy processing, scan processing and print processing every unit referred to as a job. For example, the photocopy processing executed in accordance with one instruction is managed as a photocopying job. The photocopy processing includes: the scan processing to read a draft image; and the print processing to print the image read by the scan processing. Therefore, the photocopying job may be managed by a scanning job and a printing job.

The MFP 1 has a monochromatic mode, a color (full color) photocopy mode, an auto color mode and a two-color mode (two-color photocopy) as the above photocopying function.

The monochromatic mode is a mode to read the draft image as the monochromatic image, and monochromatically print the read monochromatic image on the image forming medium. In the monochromatic mode, monochromatic scan and monochromatic print are determined at a time when the user requests photocopy, that is, at a time when a photocopying job is generated. Therefore, in the monochromatic mode, the MFP 1 handles the print of all draft images as the monochromatic print.

The color mode is a mode to read the draft image as the color image, and chromatically print the read color image on the image forming medium. In the color mode, it is determined that color scan and color print be performed at a time when the user requests the photocopy, that is, at a time when the photocopying job is generated. Therefore, in the color mode, the MFP 1 handles the print of all the draft images as the color print.

In the auto color mode, it is judged (color judgment) whether the draft image is chromatic or monochromatic, and color photocopy (color scan and color print) or monochromatic photocopy (color scan and monochromatic print) is executed in accordance with the judgment result. In the auto color mode, it is not determined that the monochromatic print or the color print is performed at a time when the user requests the photocopy, that is, at a time when the photocopying job is generated Therefore, in the auto color mode, the MFP 1 determines that the print of each draft image is handled as the color print or the monochromatic print in accordance with a result of color judgment with respect to each draft image.

The two-color mode is a mode which prints the draft image in two colors. The two-color mode further includes: a black red mode which photocopies the image in two colors of black and red; and a two-color selection mode which photocopies the image in selected two colors. In the draft image, the black red mode distinguishes between a red portion and another color portion (portion of color other than red), the red portion is printed in red, and the other color portion is printed in black. In the two-color selection mode, the whole draft image is distinguished in the selected two colors (first or second color), a portion of the first color is printed in the first color, and a portion of the second color is printed in the second color.

In such two-color mode, it is difficult to uniformly judge whether to handle the print (two-color print) of the draft image as the monochromatic print or the color print. Therefore, in the MFP 1, the count-up setting information 32 can set the two-color print of the draft image in the two-color mode to be handled as the color print or the monochromatic print.

Moreover, the MFP 1 manages, as the printing job, the print processing in response to one printing request received by the network printing function. The MFP 1 selectively executes the color print or the monochromatic print as the network printing function in accordance with the printing image data received together with the printing request from each PC 2. It is to be noted that there might be a case where it is not known whether the print is chromatic or monochromatic at a time when the printing request is received in accordance with an application program of the PC 2 which requests the printing. In such case, the MFP 1 distinguishes between color printing image data and monochromatic printing image data, and performs the color print or the monochromatic print in accordance with the judgment result in the same manner as in the auto color mode.

Next, there will be described the division management function of the MFP 1.

The division management function of the MFP 1 is a function of division management means for managing use results (the number of printed pages, etc.) of the MFP 1 for each division. For example, in the image forming system shown in FIG. 1, the division management function of the MFP 1 manages the number of the pages printed for each division or limits the number of printable pages for each division. It is to be noted that the division management function is set to be valid or invalid by an operation of the operation panel 12.

Moreover, the division management function manages each division in accordance with division management information set beforehand by the operation panel 12 or the like. The division management information is information on the division as the management object, and stored in the HDD 29 or the like. The division management information is set in association with a division code for identifying each division. In other words, the division to be managed by the division management function is set beforehand as the division management information associated with the division code for identifying the division.

Furthermore, as the division management information, each division counter 31 associated with each division code is defined (set) in the HDD 29. The division counter 31 is a counter which counts the number of the pages printed for each division. Further as the division management information, an upper limit of the number of the pages (division limit) or the like is set in accordance with the division code corresponding to each division as the management object. The division limit is the upper limit of the number of printable pages for each division. In other words, the division limit indicates an upper limit value with respect to the counter value of the division counter 31.

For example, in the image forming system shown in FIG. 1, the divisions constituting the management objects are the divisions A, B, C and D. In this case, unique division codes are set to the divisions (divisions A, B, C and D), respectively. In a case where the thus set division management function is valid, the MFP 1 identifies the division to which the user belongs based on the division code designated by the user.

It is to be noted that in the MFP 1, a function (user management function) may be set which performs management for each user in the same manner as in the above-described management for each division. In this case, the user management function manages each user in accordance with user management information set beforehand in the same manner as in the division management function. The user management information is set in accordance with user identification information (user code) for identifying the user as the management object in the same manner as in the division management information. As the user management information, a user counter (not shown) for counting the number of the pages printed by the user, an upper limit of the number of pages printable by the user (user limit) and the like are set in accordance with the user identification information.

In a case where the photocopying function is utilized in a state in which the division (user) management function is valid, the user inputs the division (user) code by the operation panel. 12 of the MFP 1. When the division (user) code is input by the operation panel 12, the MFP 1 authenticates the user's division (user) based on the division (user) code input by the user and the division (user) code as the division (user) management information set beforehand. Accordingly, when the division (user) is identified, the MFP 1 is brought into a state in which the photocopy is possible in response to the user's operation. When the user operates the operation panel 12 to request desired photocopy in this state, the MFP 1 executes the requested photocopy processing, and counts the number of the pages printed as photocopies in the division (user) counter 31 corresponding to the identified division (user).

Moreover, in a case where the network printing function is utilized in a state in which the division (user) management function is valid, the user indicates the image to be printed in the MFP 1 in a state in which each PC 2 designates the division code (or the user code of the user) of the division to which the user belongs. In this case, the PC 2 transmits a printing request including the printing image data and the division (user) code to the MFP 1 via the network 3.

On receiving the printing request from the PC 2 via the network 3, the MFP 1 authenticates the user's division (user) based on the division (user) code included in the received printing request and the division (user) code as the division (user) management information set beforehand. Accordingly, in a case where the division (user) is identified which has requested the printing, the MFP 1 executes the print processing based on the received printing image data, and counts the number of the pages printed in the print processing in the division counter 31 (user counter) corresponding to the identified division (user).

Next, there will be described a color management (management for color only) function to be performed in a case where the division management function is valid.

The MFP 1 has the color management (management for color only) function which manages only the number of the chromatically printed pages for each division (or each user), when the division management function (or the user management function) is valid. This color management function is a function which counts only the number of the chromatically printed pages for each division (user) in the division (user) management function. In other words, the color management function is a function (a function which does not manage the monochromatic print for each division) which does not count the number of monochromatically printed pages in the division counter. It is to be noted that the color management function is set to be valid or invalid in accordance with the operation of the operation panel 12.

In the MFP 1 having a state in which the above color management function is valid, only the number of the chromatically printed pages is regarded as the management object, and the number of the monochromatically printed pages is not regarded as the management object. That is, in a state in which the color management function is valid, the number of the chromatically printed pages is counted in the division counter 31 (user counter) disposed for each division (user), and the number of the monochromatically printed pages is counted in the division undefined counter 30 in which any specific division (user) is not defined.

Therefore, the color management function can execute the monochromatic print even in a state in which any division (user) is not identified. Since the color management function counts only the number of the chromatically printed pages, the division (user) limit is a restriction on the number of the chromatically printed pages. In other words, eve n in a case where the division (user) limit is set, the color management function can limitlessly execute the monochromatic print.

In general, in the monochromatic print, consumption of a developer such as toner, a photosensitive member or the like is small, and cost is small as compared with the color print. The monochromatic print is utilized in performing miscellaneous daily printings in many cases. In such situation, there is a case where any restriction is not imposed on the monochromatic print, and the number of the chromatically printed pages is requested to be limited. In such case, the above color management function sets beforehand the upper limit (division limit or user limit) of the number of the chromatically printed page. In this case, when the color management function is valid, the monochromatic print can limitlessly be performed, and the color print is limited by the division limit or the user limit.

Next, there will be described a counting method of each counter in accordance with set situations of the division management function and the color management function.

FIG. 3 shows an example of the count-up setting information 32.

As described above, in the HDD 29, there are set the division undefined counter 30 and the division counter 31 corresponding to each division, and there is stored the count-up setting information 32 which defines the method of counting the number of the pages printed by the printer unit 14.

The example of the count-up setting information 32 shown in FIG. 3 shows: the counting method in accordance with various types of functions and print modes in a state in which the division management function is valid and the color management function is not valid; and the counting method in accordance with various types of functions and print modes in a state in which both of the division management function and the color management function are valid.

According to the count-up setting information 32 shown in FIG. 3, the method of counting the number of the monochromatically printed pages differs with the photocopying function and the printing function in a case where the color management function is valid and a case where the color management function is not valid. The count-up setting information 32 shown in FIG. 3 is set so that the number of the monochromatically printed pages is counted in the division undefined counter 30 in a state in which both of the division management function and the color management function are valid, and the number of the chromatically printed pages is counted in the division counter 31. On the other hand, the information is set so that the number of the monochromatically printed pages and the number of the chromatically printed pages are both counted in the division counter 31 in a state in which the division management function is valid and the color management function is not valid. Therefore, when the count-up setting information 32 shown in FIG. 3 is set, in the MFP 1, the color management function can count the number of the monochromatically printed pages in the division undefined counter 30.

Moreover, in the example of the count-up setting information 32 shown in FIG. 3, the number of the pages printed by two-color print (two-color photocopy) can be set to be counted in the division counter 31 or the division undefined counter 30 in a state in which the division management function and the color management function are valid. As described above, since the print processing is performed in two colors, it is difficult to uniformly set the two-color print to be handled as the color print or the monochromatic print.

Therefore, in the example of the count-up setting information 32 shown in FIG. 3, the number of the pages printed in two colors can be set to be counted in the division counter 31 (the two-color print is handled as the color print) or the division undefined counter 30 (the two-color print is handled as the monochromatic print). Moreover, such count-up setting information 32 is set by the user or the manager. In consequence, the two-color print can be managed in accordance with user's or manager's intention.

It is to be noted that in the example shown in FIG. 3, the user or the manager can set the two-color print in a state in which the division management function and the color management function are valid, but another item of the count-up setting information 32 may be set by the user or the manager. For example, the number of the pages monochromatically printed by the photocopying function may be set to be counted by the division counter, even if the color management function is valid. The number of the pages monochromatically printed by the printing function may be set to be counted by the division counter, even if the color management function is valid.

Moreover, as described above, the two-color print includes the red black mode and the two-color selection mode. Therefore, the red black mode of the two-color print and the two-color selection mode of the two-color print may be set so that the number of the pages is counted in the division counter (the print is handled as the color print) or in the division undefined counter (handled as the monochromatic print). In this case, the red black mode of the two-color print can be handled as a monochromatic mode to count the number of the pages in the division undefined counter, and the two-color selection mode of the two-color print can be handled as a color mode to count the number of the pages in the division counter.

As described above, in the MFP 1, the color management function sets the number of the printed pages to be counted in the division counter or the division undefined counter in accordance with the count-up setting information for each function or printing mode. In consequence, in the MFP, count-up specifications in the color management function can be set in accordance with user's or manager's request for each function or operation mode.

Next, there will be described auto photocopy in the MFP 1 constituted as described above.

Figure 4:
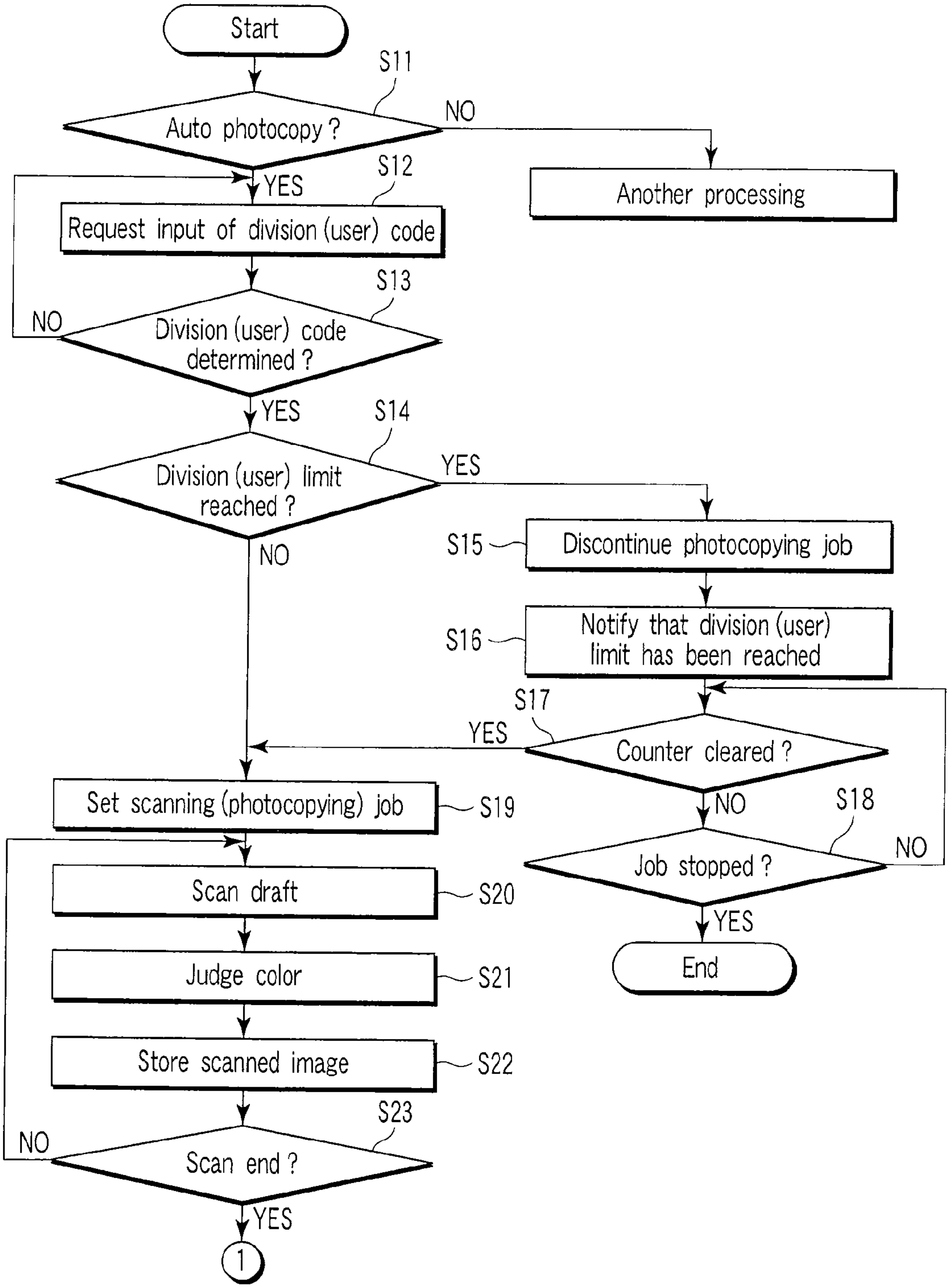
FIG. 4 is a flowchart showing auto photocopying in a case where a division management function and a color management function are valid.
Figure 5:
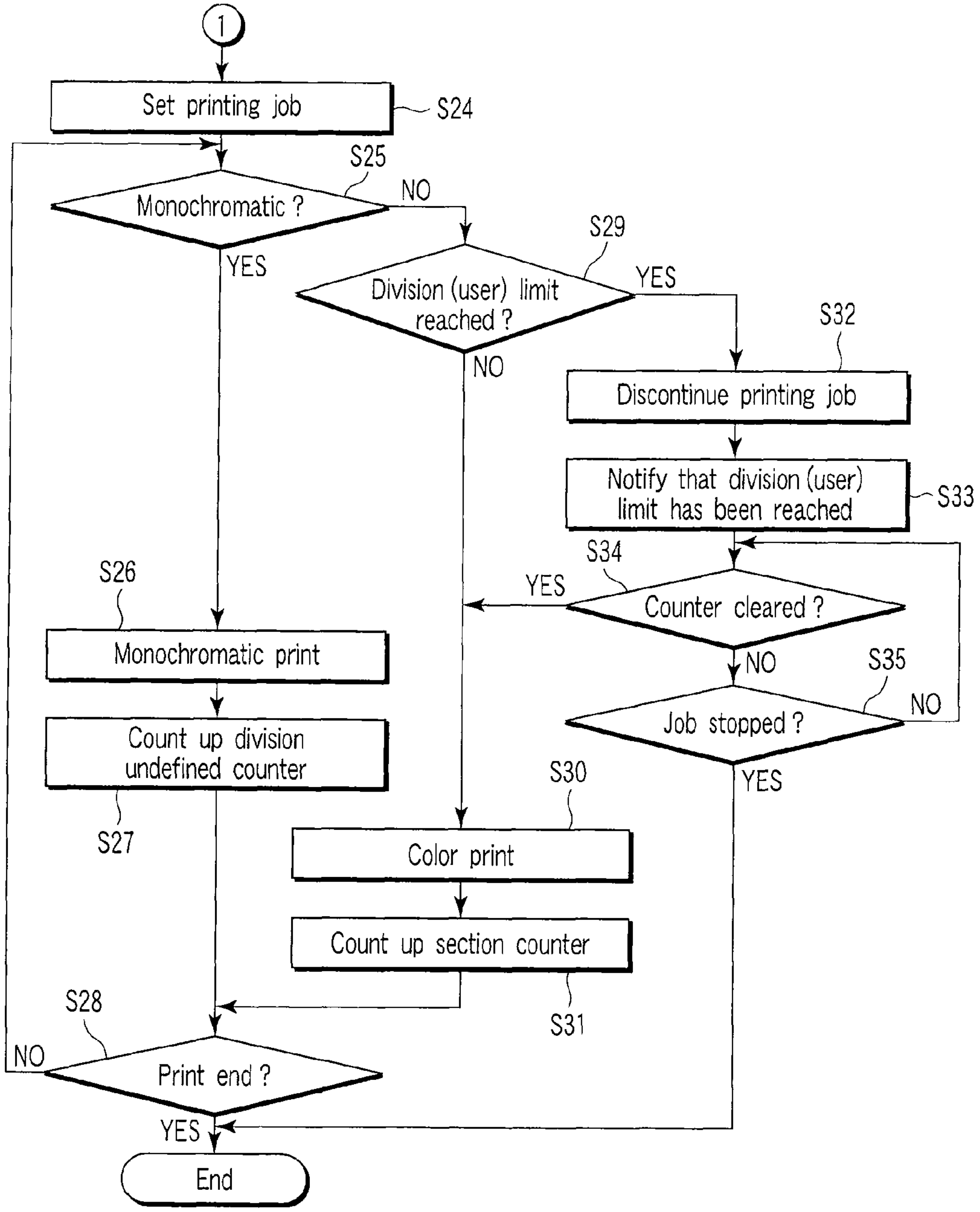
FIG. 5 is a flowchart showing auto photocopying in a case where the division management function and the color management function are valid.

FIGS. 4 and 5 are flowcharts showing a processing example of the auto photocopy in a case where the division management function and the color management function are valid.

First, it is assumed that the user instructs the auto photocopy in the operation panel 12. When the operation panel 12 instructs the auto photocopy (step S11, YES), the CPU 21 of the system control unit 11 determines the division by the division code (steps S12 and S13).

To determine this division code, the CPU 21 first requests the user to input the division code (step S12). As, for example, a request for input of the division code, the CPU 21 allows the operation panel 12 to display a guidance which requests the input of the division code. When the user inputs the division code into the operation panel 12 in response to such request, the CPU 21 judges whether or not the division code input into the operation panel 12 agrees with any of the division codes set beforehand (step S13). In a case where this judgment is that the division code input by the user agrees with the division code set beforehand, the CPU 21 determines the division code input by the user as the division of the requested auto photocopy.

When the division code is determined by the above processing, the CPU 21 checks the division counter 31 of the division corresponding to the division code (step S14). During the checking of the division counter 31, the CPU 21 judges whether or not the value of the division counter 31 of the division corresponding to the division code has reached the division limit (step S14).

In a case where this judgment is that the value of the division counter 31 of the division reaches the division limit (step S14, YES), the CPU 21 discontinues the photocopying job (step S15), it is indicated in the operation panel 12 that the photocopy has been discontinued (or the photocopy cannot be started) because the counter value of the division counter 31 of the division reaches the division limit (step S16).

In a case where the photocopying job is discontinued owing to the division limit, to start (resume) the photocopying job, the counter value of the division counter 31 of the division needs to be cleared by a predetermined operation. Therefore, the CPU 21 may allow the operation panel 12 to indicate that the photocopy has been discontinued. Moreover, there may be displayed the guidance indicating that the division counter needs to be cleared in order to resume the print. To stop the photocopying job, the operation panel 12 indicates that the photocopying job is stopped.

When the photocopying job is discontinued in the step S15, the CPU 21 judges whether or not the counter value of the division counter 31 which has reached the division limit is cleared (step S17), and also judges whether or not the photocopying job has been discontinued (step S18). In a case where the judgment is that the counter value of the division counter 31 which has reached the division limit is cleared (step S17, YES), the CPU 21 starts the photocopying job and advances to step S19. In a case where the judgment is that the photocopying job is instructed to be discontinued (step S18, YES), the CPU 21 discontinues the photocopying job.

It is to be noted that in a case where the user limit is set, the CPU 21 further determines the user, and checks the user counter of the user. The CPU performs a control based on the user limit in the same manner as in the control based on the division limit. That is, in a case where the user limit is set, the CPU 21 performs processing similar to that of the steps S12 to S18 with respect to the user who has instructed the photocopy. Accordingly, the MFP 1 can check the user limit in addition to the division limit.

Moreover, in the processing example shown in FIGS. 4 and 5, on receiving a request for the auto photocopy, the division (user) code is determined. In the processing example shown in FIGS. 4 and 5, when the photocopy is requested, the division code is determined to check the division counter 31. In consequence, in the processing example shown in FIGS. 4 and 5, at a time when the user instructs the photocopy, that is, the photocopy is requested, it can be checked whether or not the division (or the user) is brought into a state in which the color photocopy is possible, and the check result can be notified to the user.

However, in the above auto photocopy, the only monochromatic photocopy might be performed. That is, when the request for the auto photocopy is received, it is not known whether or not to chromatically photocopy the pages to be counted by the division counter 31. The color management function permits the monochromatic print, even if the division counter reaches the division limit. The division code is information required for specifying the division counter which counts the number of the chromatically printed pages. Therefore, the division code may be determined before the color print is performed.

To be specific, in the processing example of the auto photocopy shown in FIGS. 4 and 5, the division code may be determined before step S29 described later. The division counter corresponding to the division code may be checked before the step S29 described later. Therefore, the steps S12 to S18 may be omitted, and the division code may be determined as in the steps S12 and S13 before the step S29 described later. In processing of and after the step S29 described later, the division counter is checked immediately before the color print. Therefore, the steps S14 to S18 may be omitted.

Moreover, as a modification example, in draft scan processing, the division code may be determined at a time when the draft is detected to be chromatic. In this case, specifically, when color judgment of step S21 described later judges that the draft image is chromatic, processing for determining the division code and the checking (steps S12 to S18) of the division limit may be performed.

When the division (user) code is determined (step S13, YES), the CPU 21 sets the photocopying job (scanning job of the auto photocopy) for executing the photocopy requested by the user (step S19). When such photocopying job is set, the CPU 21 first scans an image to be photocopied in order to read each draft image as a photocopying object (steps S20 to S23).

That is, when the scanning job of the auto photocopy is set, the CPU 21 allows the scanner unit 13 to read the draft image (step S20). Here, it is assumed that the scanner unit 13 reads the draft images page by page. When the draft image is read, the CPU 21 performs color judgment to judge whether the draft is chromatic or monochromatic from the image data (scanned image) of the draft read by the scanner unit 13 (step S21). When the color judgment is performed with respect to the scanned draft image, the CPU 21 stores the result of the color judgment together with the draft image data in storage means such as the HDD 29 (step S22).

When the scanned image read by the scanner unit 13 and the judgment result of the color judgment are stored, the CPU 21 judges whether or not all the drafts have been scanned to judge whether or not to end the draft scan processing (step S23). In a case where this judgment is that the draft scan processing does not end (step S23, NO), the CPU 21 returns to the step S20. That is, the CPU 21 repeatedly performs the processing of the steps S20 to S23 until all the drafts are scanned.

Moreover, when the above judgment is that the scanning of the draft ends (step S23, YES), the CPU 21 sets the printing job for printing the draft image read by the scan processing (step S24). When such printing job is set, the CPU 21 performs the printing job to successively print each page image on a photocopy sheet (steps S25 to S35).

That is, when the printing job corresponding to the photocopy is set, the CPU 21 successively reads out the draft image read by the above scan processing in the page memory 28, and judges based on the result of the color judgment whether the page is a monochromatically printed page to be counted in the division undefined counter 30 or a chromatically printed page to be counted in the division counter 31 (step S25).

Here, the count-up setting information 32 is set so that the monochromatically printed page is counted in the division undefined counter 30 and the chromatically printed page is counted in the division counter 31. In other words, the judgment of the step S25 judges based on the count-up setting information 32 whether the printed page is counted in the division undefined counter 30 or the division counter 31.

In a case where the judgment is that the page to be printed is monochromatic (step S25, YES), the CPU 21 allows the printer unit 14 to monochromatically print the image data of the page developed in the page memory 28 (step S26), and counts up the division undefined counter 30 (step S27).

When the division undefined counter 30 is counted up, the CPU 21 judges whether or not the printing of the images of all the pages has ended to thereby judge whether or not to end the printing job (step S28). In a case where this judgment is that the printing of all the pages has not ended (step S28, NO), the CPU 21 returns to the step S25, and executes the print processing of the next page. In a case where the above judgment is that the printing of all the pages has ended (step S28, YES), the CPU 21 normally ends the printing job, that is, the photocopy requested by the user.

Moreover, in a case where the above judgment is that the page to be printed is chromatic (step S25, NO), the CPU 21 judges whether or not the counter value of the division counter 31 of the division corresponding to the photocopy division code has reached the division limit of the division (step S29). It is to be noted that if the user limit is set, the CPU 21 further checks whether or not the counter value has reached the user limit.

In a case where the above judgment is that the counter value has not reached the division limit (step S29, YES), the CPU 21 allows the printer unit 14 to chromatically print the image data of the page developed in the page memory 28 (step S30), counts up the division counter 31 of the division (step S31), and advances to the step S28.

Moreover, in a case where the above judgment is that the counter value of the division counter 31 of the division has reached the division limit (step S29, YES), the CPU 21 discontinues the printing job (step S32), and allows the operation panel 12 to display that the printing is discontinued because the counter value of the division counter 31 of the division has reached the division limit (step S33). Furthermore, in this case, the CPU 21 allows the operation panel 12 to display a guidance indicating that the division counter needs to be cleared in order to resume the printing.

Similarly, in a case where it is judged that the counter value of the user counter of the user has reached the user limit (step S29, YES), the CPU 21 discontinues the printing job (step S32), and allows the operation panel 12 to indicate that the printing has been discontinued because the counter value of the user counter (not shown) reaches the user limit (step S33).

In a case where the printing job is discontinued owing to the division limit (or the user limit) in this manner, to resume the printing job, the division counter 31 of the division or the user counter of the user needs to be cleared by a predetermined operation. Therefore, the CPU 21 may allow the operation panel 12 to indicate that the printing has been discontinued and display the guidance indicating that the user counter be cleared to resume the printing. To stop the printing job, the operation panel 12 indicates that the printing job be stopped.

In a case where the printing job is discontinued in the step S32, the CPU 21 judges whether or not the value of the division counter 31 (or the user counter) is cleared which has reached the division limit (or the user limit) (step S30), and judges whether or not the job has been stopped (step S31).

Therefore, in a case where the counter value of the division counter 31 (or the user counter) is cleared which has reached the division limit (or the user limit) (step S30, YES), the CPU 21 resumes the printing job, and advances to the step S30. In a case where the job is instructed to be stopped (step S35, YES), the CPU 21 abnormally ends the printing job, that is, the photocopy requested by the user.

As described above, in the MFP 1, in a case where both of the division management function and the color management function are valid, the count-up setting information is set so that the number of the pages printed in the color mode is counted in the division counter, and the number of the pages printed in the monochromatic mode is counted in the division undefined counter. In the MFP 1, in a case where both of the division management function and the color management function are valid, the number of the chromatically photocopied pages, that is, the chromatically printed pages is counted up in the division counter. In the MFP 1, in a state in which both of the division management function and the color management function are valid, the number of the monochromatically photocopied (monochromatically printed) pages is counted up in the division undefined counter.

Furthermore, in the auto photocopy mode, the MFP 1 judges whether or not the draft image is chromatic or monochromatic. Therefore, in the auto photocopy mode, in a state in which both of the division management function and the color management function are valid, the MFP 1 prints the color draft image in the color mode, and counts up the number of the pages printed (photocopied) in the color mode in the division counter. In such state, the MFP 1 prints the monochromatic draft image in the monochromatic mode, and counts up the number of the pages printed (photocopied) in the monochromatic mode in the division undefined counter.

In consequence, the MFP 1 allows each division counter to manage only the number of the chromatically printed pages for each division, and allows each division undefined counter to manage the number of the monochromatically printed pages which are not management objects for each division.

Next, there will be described the two-color photocopy in the MFP 1 constituted as described above.

Figure 6:
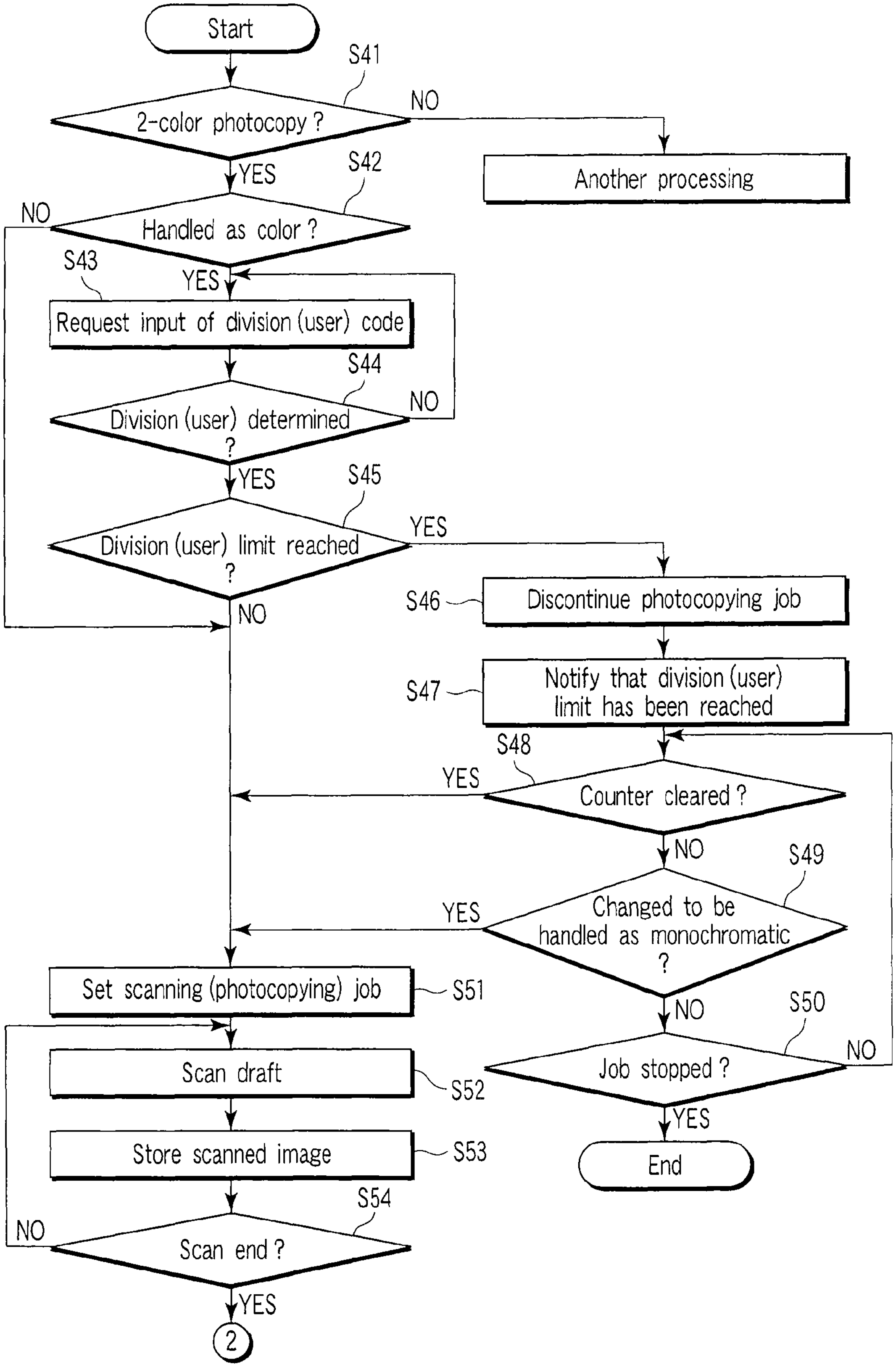
FIG. 6 is a flowchart showing two-color photocopying in a case where the division management function and the color management function are valid.
Figure 7:
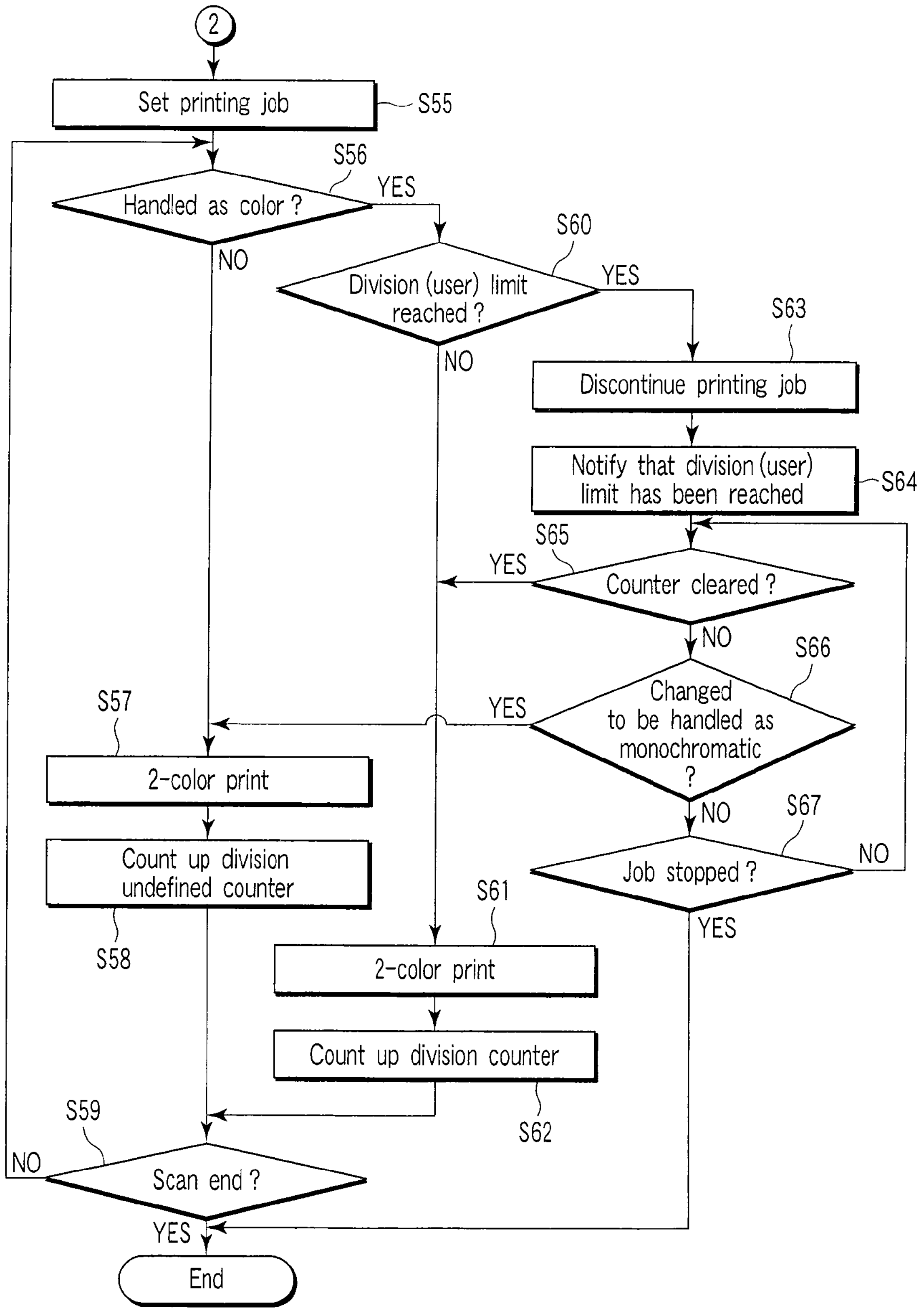
FIG. 7 is a flowchart showing the two-color photocopying in a case where the division management function and the color management function are valid.

FIGS. 6 and 7 are flowcharts showing a processing example of the two-color photocopy in a case where the division management function and the color management function are valid.

First, the user instructs the two-color photocopy in the operation panel 12. For example, the two-color photocopy is instructed by selecting the black red mode or the two-color selection mode in a state in which the user selects the two-color photocopy mode in the operation panel 12. In the two-color selection mode, the user further selects two colors (first and second colors) indicated in the operation panel 12.

When the operation panel 12 instructs the two-color photocopy (step S41, YES), the CPU 21 of the system control unit 11 judges based on the count-up setting information 32 whether the two-color photocopy is handled as the color photocopy or the monochromatic photocopy (step S42).

The count-up setting information 32 sets the number of the pages printed during the two-color photocopy to be counted up in the division undefined counter 30 or the division counter 31.

For example, in a case where the two-color photocopy is handled as the color photocopy, the count-up setting information 32 sets the number of the pages printed during the two-color photocopy to be counted in the division counter 31. In a case where the two-color photocopy is handled as the monochromatic photocopy, the count-up setting information 32 sets the number of the pages printed during the two-color photocopy to be counted in the division undefined counter 30.

That is, the CPU 21 judges whether the two-color photocopy is handled as the color photocopy or the monochromatic photocopy with reference to the count-up setting information 32. In a case where the above judgment is that the two-color photocopy is handled as the color photocopy (step S42, YES), the CPU 21 determines the division (or user) code (steps S43 and S44).

To determine this division code, the CPU 21 first requests the user to input the division (or the user) code (step S43). As, for example, a request for input of the division (user) code, the CPU 21 allows the operation panel 12 to display a guidance which requests the input of the division (user) code.

When the user inputs the division (user) code into the operation panel 12 in response to such request, the CPU 21 judges whether or not the division (user) code input into the operation panel 12 agrees with any of the division (user) codes set beforehand (step S44).

In a case where this judgment is that the division (user) code input by the user agrees with the division (user) code set beforehand, the CPU 21 determines the division (user) code input by the user as the division (user) of the two-color photocopy to be handled as the requested color photocopy.

When the division (user) code of the two-color photocopy to be handled as the color photocopy is determined in this manner, the CPU 21 checks the division counter 31 of the determined division (user) (steps S45 to S50).

During the checking of the division counter 31, the CPU 21 first judges whether or not the value of the division counter 31 of the division (user) corresponding to the division (user) code determined in the step S44 has reached the division (user) limit of the division (user) (step S45). In a case where this judgment is that the value of the division counter 31 of the division (user) has reached the division (user) limit (step S45, YES), the CPU 21 discontinues the photocopying job (step S46).

In this case, the CPU 21 allows the operation panel 12 to indicate that the two-color photocopy has been discontinued (or the two-color photocopy cannot be started) because the counter value of the division counter 31 of the division (user) reaches the division (user) limit (step S47).

In a case where the photocopying job of the two-color photocopy is discontinued owing to the division (user) limit in this manner, to start the photocopying job, the value of the division counter 31 of the division (user) needs to be cleared by a predetermined operation, or the setting needs to be changed so that two-color photocopy is handled as the monochromatic photocopy.

Therefore, the CPU 21 may allow the operation panel 12 to indicate that the two-color photocopy has been discontinued. Moreover, there may be displayed the guidance indicating that the value of the division counter needs to be cleared in order to start the two-color photocopy. Alternatively, it may be indicated that the setting is changed to handle the two-color photocopy as the monochromatic photocopy. To stop the photocopying job, it is indicated that the photocopying job is stopped.

When the photocopying job is discontinued owing to the division (user) limit in the step S46, the CPU 21 judges whether or not the value of the division counter 31 is cleared which has reached the division (user) limit (step S48), judges whether or not the two-color photocopy is changed to be handled as the monochromatic photocopy (step S49), and judges whether or not the job has been instructed to be stopped (step S50).

In a case where the value of the division counter 31 is cleared which has reached the division (user) limit in this state (step S48, YES), the CPU 21 starts the photocopying job and advances to step S51. In a case where the two-color photocopy is changed to be handled as the monochromatic photocopy (step S49, YES), to start the photocopying job, the CPU 21 advances to the step S51. In a case where the judgment is that the job is instructed to be stopped (step S50, YES), the CPU 21 abnormally ends the photocopying job, that is, the two-color photocopy requested by the user.

Moreover, in a case where it is judged that the division counter 31 corresponding to the division (user) code does not reach the division (user) limit (step S45, YES), in a case where the value of the division counter 31 has been cleared (step S48, YES) or in a case where the two-color photocopy is changed to be handled as the monochromatic photocopy (step S49, YES), the CPU 21 sets the photocopying job (scanning job of the two-color photocopy) for executing the two-color photocopy requested by the user (step S51). When such photocopying job is set, the CPU 21 performs the scan processing to read each draft image as a two-color photocopying object (steps S52 to S54).

That is, when the scanning job of the two-color photocopy is set, the CPU 21 allows the scanner unit 13 to perform the scan processing for reading the draft image to acquire image data for the two-color print (step S52). Here, it is assumed that the scanner unit 13 reads the draft images page by page. As the draft image acquired by such scan processing, the image data for the two-color print is stored in storage means such as the HDD 29 (step S53).

When the two-color printing image data acquired by the above scan processing is stored, the CPU 21 judges whether or not the scan processing of all the drafts has been completed to thereby judge whether or not to end the draft scan processing (step S54). In a case where this judgment is that the draft scan processing does not end (step S54, NO), the CPU 21 returns to the step S52. That is, the CPU 21 repeatedly performs the processing of the steps S52 to S54 until the scan processing of all the drafts is completed.

Moreover, when the above judgment is that the scan processing of all the drafts ends (step S54, YES), the CPU 21 sets the printing job for printing the image data for the two-color print as the draft image read by the scan processing (step S55). When such printing job is set, the CPU 21 performs the printing job to successively print each page image on a photocopy sheet in two colors (steps S56 to S66).

That is, the CPU 21 successively reads out the draft image read as the two-color image data by the above scan processing in the page memory 28. Here, in a case where the two-color photocopy (two-color print) is handled as the monochromatic photocopy (monochromatic print) (step S56, NO), the CPU 21 allows the printer unit 14 to print, in two colors, the image data of the page developed in the page memory 28 (step S57), and counts up the division undefined counter 30 (step S58).

When the division undefined counter 30 is counted up, the CPU 21 judges whether or not the printing of the images of all the pages has ended to thereby judge whether or not to end the printing job (step S59). In a case where this judgment is that the printing of all the pages has not ended (step S59, NO), the CPU 21 returns to the step S56, and executes processing of the next page.

Moreover, in a case where the above judgment is that the printing of all the pages has ended (step S59, YES), the CPU 21 normally ends the printing job, that is, the two-color photocopy requested by the user.

Furthermore, in a case where the two-color photocopy (two-color print) is handled as the color photocopy (color print) (step S56, YES), the CPU 21 judges whether or not the value of the division counter 31 of the division (user) corresponding to the division (user) code determined in the step S44 has reached the division (user) limit of the division (user) (step S60).

In a case where this judgment is that the value has not reached the division (user) limit (step S54, YES), the CPU 21 allows the printer unit 14 to print, in two colors, the image data of the page developed in the page memory 28 (step S61), counts up the division counter 31 of the division (user) (step S62), and advances to the step S59.

Moreover, in a case where the above judgment is that the value of the division counter 31 of the division (user) has reached the division (user) limit (step S60, YES), the CPU 21 discontinues the printing job (step S63), and allows the operation panel 12 to display that the printing has been discontinued because the value of the division counter 31 of the division (user) has reached the division (user) limit (step S64).

In a case where the printing job of the two-color photocopy is discontinued owing to the division (user) limit, to resume the printing job, the value of the division counter 31 of the division (user) needs to be cleared by a predetermined operation, or the setting needs to be changed so that the two-color photocopy is handled as the monochromatic photocopy. Therefore, the CPU 21 may allow the operation panel 12 to indicate that the printing has been discontinued and display the guidance indicating that the value of the division counter be cleared or the two-color photocopy be changed to be handled as the monochromatic photocopy in order to resume the printing. To stop the printing job, the operation panel indicates that the printing job be stopped.

In a case where the printing job is discontinued owing to the division (user) limit in the step S63, the CPU 21 judges whether or not the value of the division counter 31 is cleared which has reached the division (user) limit (step S65), and judges whether or not the two-color photocopy has been changed to be handled as the monochromatic photocopy (step S66) and whether or not the job has been instructed to be stopped (step S67), respectively.

In a case where the value of the division counter 31 is cleared which has reached the division (user) limit in this state (step S65, YES), the CPU 21 resumes the printing job, and advances to the step S61. In a case where the two-color photocopy has been changed to be handled as the monochromatic photocopy (step S66, YES), the CPU 21 resumes the printing job, and advances to the step S67. In a case where it is instructed to stop the job (step S67, YES), the CPU 21 abnormally ends the printing job, that is, the two-color photocopy requested by the user.

As described above, in the MFP 1, the count-up setting information is set beforehand so that the number of the pages photocopied in two colors, that is, printed in two colors is counted in the division counter or the division undefined counter. In the MFP 1, in a case where the count-up setting information is set so that the number of the pages photocopied in two colors is counted in the division counter, the division of the user is identified, and the number of the pages printed in two colors is counted up in the division counter corresponding to the identified division. In the MFP 1, in a case where the count-up setting information is set so that the number of the pages photocopied in two colors is counted up in the division undefined counter, the two-color photocopy is executed, and the number of the pages printed in two colors is counted up in the division undefined counter, even if the division of the user is not identified.

In consequence, the two-color photocopy can be managed in response to user's or manager's demand.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image forming device comprising:

a printer which prints a color image in a color mode, prints a monochrome image in a monochromatic mode, and prints a two-color image in a two-color mode;

a plurality of division counters which are associated with divisions to which users belong, respectively;

a division undefined counter which is not associated with any specific division;

a first counting unit which counts the number of pages printed by the printer in each mode by the division counters corresponding to the divisions to which users belong, if a division management function is valid and a color management function is invalid;

a setting unit which sets whether to count the number of pages printed out by the printer in the two-color mode by the division counters or the division undefined counter, if both the division management function and the color management function are valid; and a second counting unit which counts the number of pages printed out by the printer in the monochromatic mode by the division undefined counter, the number of pages printed out by the printer in the color mode by the division counters corresponding to the divisions to which users belong, and the number of pages printed out by the printer in the two-color mode by the counter which is configured in the setting unit, if both the division management function and the color management function are valid.

2. The image forming device according to claim 1, further comprising an operation unit which selects whether or not the color management function is to be valid or invalid in the case where the division management function is valid.

3. The image forming device according to claim 1, wherein the two-color mode has a red black mode and a two-color selection mode, and the setting unit determines whether the number of pages printed in the red black mode and the number of pages printed in the two-color selection mode are counted by the division counters or the division undefined counter, respectively.

4. The image forming device according to claim 1, further comprising:

a judgment unit to judge whether the image to be printed on an image forming medium by the printer is chromatic or monochromatic, the printer further having, as the operation mode, an auto color mode which selects the color mode or the monochromatic mode in accordance with a judgment result of the judgment unit.

5. The image forming device according to claim 4, further comprising:

a scanner which reads the image to be printed on the image forming medium by the printer, the judgment unit judging whether the image read by the scanner is chromatic or monochromatic, the printer printing, in the color mode, the image judged to be chromatic by the judgment unit, and printing, in the monochromatic mode, the image judged to be monochromatic by the judgment unit, in a case where the operation mode is the auto color mode.

6. The image forming device according to claim 1, wherein the setting unit sets the number of the pages printed in the two-color mode to be counted in the division counters or the division undefined counter in accordance with user's designation.

7. A method of managing an image forming device having a printer which prints a color image in a color mode, prints a monochrome image in a monochromatic mode, and prints a two-color image in a two-color mode, a plurality of division counters which are associated with divisions to which users belong, respectively, and a division undefined counter which is not associated with any specific division, comprising:

executing the printing in various modes;

counting the number of pages printed by the printer in each mode by the division counters corresponding to the divisions to which users belong if a division management function is valid and a color management function is invalid;

determining by a setting unit whether to count the number of pages printed out by the printer in the two-color mode by the division counters or the division undefined counter if both the divisional management function and the color management function are valid; and counting the number of pages printed out by the printer in the monochromatic mode by the division undefined counter, the number of pages printed out by the printer in the color mode by the division counters corresponding to the divisions to which users belong, and the number of pages printed out by the printer in the two-color mode by the counter which is determined by the setting unit, if both the division management function and the color management function are valid.

8. The method of managing the image forming device according to claim 7, further comprising: selecting whether or not the color management function is to be valid or invalid in the case where the division management function is valid.

9. The method of managing the image forming device according to claim 7, wherein two-color mode has a red black mode and a two-color selection mode, and the setting unit determines whether the number of pages printed in the red black mode and the number of pages printed in the two-color selection mode are counted by the division counters or the division undefined counter, respectively.

10. The method of managing the image forming device according to claim 7, further comprising:

judging whether the image to be printed on an image forming medium is chromatic or monochromatic, the executing of the printing further including: selecting the color mode or the monochromatic mode in accordance with the judgment result to print the image in the selected mode.

11. The method of managing the image forming device according to claim 10, further comprising:

reading the image to be printed on the image forming medium, the judging including: judging whether the read image is chromatic or monochromatic, the executing of the printing including: printing, in the color mode, the image judged to be chromatic; and printing, in the monochromatic mode, the image judged to be monochromatic.

12. The method of managing the image forming device according to claim 7, wherein the number of the pages printed in the two-color mode to be counted in the division counters or the division undefined counter is set in accordance with user's designation.

13. An image forming device comprising:

image forming means which prints a color image in a color mode, prints a monochrome image in a monochromatic mode, and prints a two-color image in a two-color mode;

a plurality of division counters which are associated with divisions to which users belong, respectively;

a division undefined counter which is not associated with any specific division;

first counting means for counting the number of pages printed by the image forming means in each mode by the division counters corresponding to the divisions to which users belong, if a division management function is valid and a color management function is invalid;

a setting means for setting whether to count the number of pages printed out by the image forming means in the two-color mode by the division counters or the division undefined counter, if both the divisional management function and the color management function are valid; and second counting means for counting the number of pages printed out by the image forming means in the monochromatic mode by the division undefined counter, the number of pages printed out by the image forming means in the color mode by the division counters corresponding to the divisions to which users belong, and the number of pages printed out by the image forming means in the two-color mode by the counter which is configured in the setting means, if both the division management function and the color management function are valid.

14. The image forming device according to claim 13, further comprising an operation means for selecting whether or not the color management function is to be valid or invalid in the case where the division management function is valid.

15. The image forming device according to claim 13, wherein two-color mode has a red black mode and a two-color selection mode, and the setting means determines whether the number of pages printed in the red black mode and the number of pages printed in the two-color selection mode are counted by the division counters or the division undefined counter, respectively.

16. The image forming device according to claim 13, further comprising:

judgment means for judging whether the image to be formed on an image forming medium by the image forming means is chromatic or monochromatic, the image forming means further having, as the operation mode, an auto color mode which selects the color mode or the monochromatic mode in accordance with a judgment result of the judgment means.

17. The image forming device according to claim 16, further comprising:

reading means for reading the image to be formed on the image forming medium by the image forming means, the judgment means judging whether the image read by the reading means is chromatic or monochromatic, the image forming means forming, in the color mode, the image judged to be chromatic by the judgment means, and forming, in the monochromatic mode, the image judged to be monochromatic by the judgment means, in a case where the operation mode is the auto color mode.

18. The image forming device according to claim 13, wherein the setting means sets the number of the pages having the image formed thereon in the two-color mode to be counted in the division counters or the division undefined counter in accordance with user's designation.

* * * * *